United States Patent
Choi et al.

(10) Patent No.: US 10,491,551 B2
(45) Date of Patent: Nov. 26, 2019

(54) TERMINAL DEVICE, METHOD AND RECORDING MEDIUM CONTAINING PROGRAM FOR MESSAGE PROCESSING

(71) Applicant: SK TELECOM CO., LTD., Seoul (KR)

(72) Inventors: Jintae Choi, Seoul (KR); Sangchul Ha, Seoul (KR); Yongwon Song, Yongin-si (KR)

(73) Assignee: SK TELECOM., LTD., Seoul (KR)

( * ) Notice: Subject to any disclaimer, the term of this patent is extended or adjusted under 35 U.S.C. 154(b) by 675 days.

(21) Appl. No.: 14/927,090

(22) Filed: Oct. 29, 2015

(65) Prior Publication Data
US 2016/0050170 A1 Feb. 18, 2016

Related U.S. Application Data

(63) Continuation of application No. PCT/KR2014/009048, filed on Sep. 26, 2014.

(30) Foreign Application Priority Data
Oct. 11, 2013 (KR) .......................... 10-2013-0121063

(51) Int. Cl.
*H04L 12/58* (2006.01)
*H04W 12/12* (2009.01)

(52) U.S. Cl.
CPC .............. *H04L 51/06* (2013.01); *H04L 51/24* (2013.01)

(58) Field of Classification Search
CPC ......... H04L 51/06; H04L 51/14; H04L 45/22; H04L 45/16; H04L 45/60; H04L 47/15;
(Continued)

(56) References Cited

U.S. PATENT DOCUMENTS 8,510,773 B1* 8/2013 Abou-Rizk ........ G06Q 30/0261
  725/32
9,240,904 B2* 1/2016 LaFreniere ............. H04L 51/36
(Continued)

FOREIGN PATENT DOCUMENTS

| CN | 1816014 A | 8/2006 |
| CN | 101107868 A | 1/2008 |
| CN | 103034542 A | 4/2013 |

OTHER PUBLICATIONS

Chinese Office Action dated Jul. 4, 2018, in connection with the Chinese Patent Application No. 201480021751.X citing the above reference(s).

(Continued)

*Primary Examiner* — Sargon N Nano
(74) *Attorney, Agent, or Firm* — Hauptman Ham, LLP

(57) ABSTRACT

The present disclosure provides a terminal device. The terminal device includes: a communication unit configured to transmit or receive a message containing at least one of text, video and audio, through a communication network; a memory unit configured to store a plurality of message processing applications, and a message database (DB); and a control unit configured to perform a first delivering of the message, received through the communication unit, to the plurality of message processing applications through a first transmission path, and a second delivering, after a first predetermined time from said first delivering, of the received message again to a first message processing application among the plurality of message processing applications through a second transmission path.

16 Claims, 4 Drawing Sheets

(58) Field of Classification Search
CPC ... H04L 47/24; H04L 47/6275; H04L 69/324; H04L 51/10; H04L 67/20; H04L 63/1416; G06F 11/2012; G06F 11/2023; G06F 11/3636; G06F 9/546; G06F 21/554; G06Q 30/0251; G06Q 20/3226; G06Q 20/322; G06Q 20/3223; G06Q 20/401; G06Q 30/0601; G06Q 20/405; H04Q 3/0091; H04W 4/12; H04W 80/02; H04W 4/20; H04W 12/12; H04N 21/812; Y10S 707/99939; H04M 1/72577; H04M 1/72583

See application file for complete search history.

(56) References Cited

U.S. PATENT DOCUMENTS

| | | | | |
|---|---|---|---|---|
| 2004/0155901 | A1* | 8/2004 | McKee | G06F 9/445 715/747 |
| 2004/0267942 | A1* | 12/2004 | Maes | H04L 51/04 709/228 |
| 2008/0062246 | A1* | 3/2008 | Woodworth | H04L 51/24 348/14.01 |
| 2010/0217809 | A1* | 8/2010 | Vymenets | G06Q 10/10 709/206 |
| 2011/0078773 | A1* | 3/2011 | Bhasin | H04L 63/0838 726/5 |
| 2013/0145448 | A1* | 6/2013 | Newell | G06F 21/31 726/7 |
| 2013/0347064 | A1* | 12/2013 | Aissi | G06F 21/30 726/2 |
| 2016/0094962 | A1* | 3/2016 | Wilsher | H04L 12/287 455/466 |
| 2016/0148217 | A1* | 5/2016 | Kim | G06Q 30/0185 705/318 |

OTHER PUBLICATIONS

Chinese Office Action dated Jan. 26, 2018, issued in corresponding Chinese Patent Application No. 201480021751.X, citing the above reference(s).

* cited by examiner

TERMINAL DEVICE, METHOD AND RECORDING MEDIUM CONTAINING PROGRAM FOR MESSAGE PROCESSING

CROSS-REFERENCE TO RELATED APPLICATIONS

The present application is a continuation of International Patent Application No. PCT/KR2014/009048, filed Sep. 26, 2014, which is based upon and claims the benefit of priority to Korean Patent Application No. 10-2013-0121063, filed on Oct. 11, 2013. The disclosure of the above-listed applications is hereby incorporated by reference herein in its entirety.

TECHNICAL FIELD

The present disclosure relates to a terminal device, method and recording medium containing a program for message processing.

BACKGROUND ART

The statements in this section merely provide background information related to the present disclosure and do not necessarily constitute prior art.

In the present disclosure, term "smart phone" refers to a mobile device that provides one or more functions of personal computer (PC) and any other advanced functions, executes an open OS program that provides a standardized interface and platform for application developers. Examples "open OS program" include, but are not limited to, Android, iOS, Symbian OS, BlackBerry OS, Windows Phone, Bada, and the like.

With smart phones are popularized, a software market for free transactions of applications, having various functions and usable in the smart phones, between a developer and a user is activated and also its use is growing.

While this gives a positive aspect that a user can freely use a necessary application by downloading applications to the smart phone, this also invites a negative aspect that a malicious application such as a smishing application is spread and does harm to a user by being used for an illegal purpose such as collecting user's personal or financial information.

Particularly, a recently issued smishing application commits an illegal financial transaction such as micro payment or account transfer by snatching a message away from a user, such as a short message service (SMS) or a multimedia message service (MMS) transmitted for various financial transactions, sign-in, and the like.

Specifically, a smishing application has functions to send a spam message or a message for installing a malicious application to phone numbers stored in an address book of a certain terminal device, to install a malicious application in a terminal device of a user who opens the spam message or the above message for installing the malicious application, to snatch a message associated with user authentication or micro payment authentication and then send the snatched message to a designated address, and also to process such the snatched message to a spam message so as not to recognize micro payment processing.

The reason that such as smishing application is possible is as follows. When any downloaded application is registered, the open OS installed in the smart phone may set a priority and an option to receive a message for each application. Any received message is delivered sequentially to at least one application having the option to receive the message. At this time, an application having higher priority receives the message from the open OS and then may prevent the message from being delivered to any other application having lower priority.

Additionally, a currently used open OS may assign higher priority to an application developed by a third party and additionally installed in a terminal device in comparison with a message processing application basically offered by a manufacturer of the smart phone. However, the inventor(s) has noted that, if such an application having higher priority operates abnormally in some situations, a message is not received due to a response failure.

Therefore, the inventor(s) has noted that, a solution is needed for stably delivering a received message to a user in an environment that various applications developed using an application program interface (API) of the open OS by a third party other than a terminal device manufacturer can access the received message.

SUMMARY

In some embodiments, a terminal device includes: a communication unit configured to transmit or receive a message containing at least one of text, video and audio, through a communication network; a memory unit configured to store a plurality of message processing applications, and a message database (DB); and a control unit configured to perform a first delivering of the message, received through the communication unit, to the plurality of message processing applications through a first transmission path, and a second delivering, after a first predetermined time from said first delivering, of the received message again to a first message processing application among the plurality of message processing applications through a second transmission path.

In some embodiments, a message processing method includes: when a message containing at least one of text, video and audio is received, sequentially creating and delivering a normal message intent for firstly delivering the message to a plurality of message processing applications; creating a dedicated message intent for secondly delivering the message to a first message processing application among the plurality of message processing applications; waiting for a predetermined time from said creating the dedicated message intent; and transmitting the dedicated message intent to the first message processing application.

In some embodiments, a non-transitory computer-readable storage medium storing a program for causing a processor to execute operations including: when a message containing at least one of text, video and audio is received, sequentially creating and delivering a normal message intent for firstly delivering the message to a plurality of message processing applications; creating a dedicated message intent for secondly delivering the message to a first message processing application among the plurality of message processing applications; waiting for a predetermined time from said creating the dedicated message intent; and transmitting the dedicated message intent to the first message processing application.

DETAILED DESCRIPTION

Figure 1:
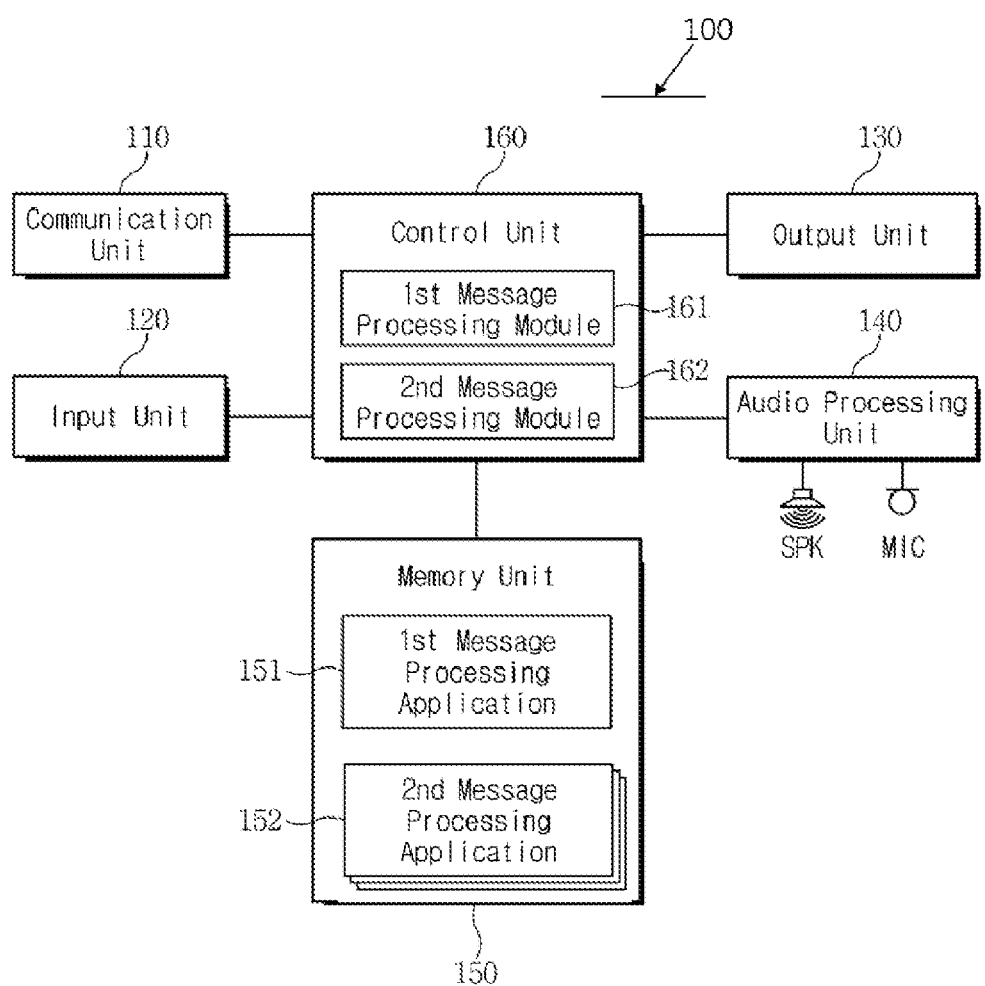
FIG. 1 is a schematic block diagram of a terminal device for message processing in accordance with some embodiments of the present disclosure.

Hereinafter, preferred embodiments of the present disclosure will be described with reference to the accompanying drawings. However, well known functions or structures may not be described or illustrated in detail to avoid obscuring the subject matter of the present disclosure. Through the drawings, the same or similar reference numerals denote corresponding features consistently.

The present disclosure relates to processing of a message received through a communication network in a terminal device, and, in some embodiments, the terminal device to which this disclosure is applied installs a variety of applications. In some embodiments, the terminal device of this disclosure installs a plurality of message processing applications that perform one or more message-associated processes, and the plurality of message processing applications includes a message processing application developed by a manufacturer of the terminal device and installed at the time of manufacture of the terminal device. The message processing application is configured to basically perform transmission, reception and management of a message. Another message processing application developed by a third party, utilizing an application programming interface (API) offered by an open operating system (open OS) of the terminal device, other than the manufacturer, is capable of one or more message-associated processes by using a received message. In some embodiments, the message processing application developed by a third party is implemented to have various functions in addition to the message-associated processes, and also is installed in a plurality of terminal devices.

Hereinafter, for clarity, a message processing application developed by the manufacturer and installed at the time of manufacture of the terminal device to basically perform transmission, reception and management of a message will be referred to as a first message application, and a message processing application developed by a third party will be referred to as a second message processing application.

Additionally, in some embodiments, the terminal device according to this disclosure includes a smart phone, a tablet PC, and the like. For reference, the open OS installed in the terminal device 100 (shown in FIG. 1) to which this disclosure is applied is an operating system, e.g., such as Android, iOS, Symbian OS, BlackBerry OS, Windows Phone, Bada, etc., which provides a standardized interface and platform for application developers.

Further, the message transmitted to the terminal device according to this disclosure refers to a message that contains one or more of text, video, and audio. In some embodiments, such a message is transmitted through, but not limited to, a Short Message Service (SMS) or a Multimedia Message Service (MMS) offered via a mobile communication network. Also, in some embodiments, the message is transmitted through an Instant Messaging (IM) service performed via various kinds of wired or wireless communication networks.

The present disclosure is to provide a message processing function for safely delivering a received message to a user even though any interference or abnormal operation occurs in a second message processing application developed by a third party and capable of message-associated processing by using a received message. Now, related structure and operation will be described with reference to the drawings.

FIG. 1 is a schematic block diagram of a terminal device for message processing in accordance with some embodiments of the present disclosure.

Referring to FIG. 1, the terminal device 100 according to this disclosure includes a communication unit 110, an input unit 120, an output unit 130, an audio processing unit 140, a memory unit 150, and a control unit 160.

The communication unit 110 is configured to access a wired or wireless communication network and to transmit or receive data to or from the network. In some embodiments, the communication unit 110 accesses a wired/wireless communication network of a mobile communication network or the like such as, e.g., internet, Wi-Fi network, WCDMA, LTE, LTE-A, or the like, and includes, for this access, at least one communication module for processing outgoing or incoming data according to a communication protocol applied to the communication network to be accessed. In this disclosure, the communication unit 110 transmits or receives a message that contains at least one of text, video, audio, and image which are provided to the terminal device 100 through a wired or wireless communication network.

The input unit 120 is configured to allow a user to manipulate one or more functions of the terminal device 100. In some embodiments, the input unit 120 is configured to select a function and to enter data or a control command. In some embodiments, the input unit 120 includes various input mechanisms such as a keyboard having a plurality of buttons (or keys) for entering letters, numbers and/or special symbols, a mouse for moving a pointer displayed on the screen, allowing a click or double-click on a specific position, and executing various operations depending on such a position, a gesture recognizing means for recognizing a predefined gesture, e.g., a facial expression, a hand gesture, a body gesture, a motion, etc., corresponding to a user command, and the like.

The output unit 130 is configured to output a user interface screen depending on the operation of the terminal device 100 and one or more operations of various applications. In some embodiments, the output unit 130 outputs an operating environment constructed by the open OS of the terminal device 100 and also outputs an execution screen of an application executed on the basis of the operating environment. In some embodiments, the output unit 130 outputs a reception notification of message and a received message. In some embodiments, the output unit 130 includes a touch screen in which the input unit 120 is integrated with the output unit 130.

The audio processing unit 140 is configured to support an auditory user interface created during the operation of the terminal device 100. For example, in case of a call function, the audio processing unit 140 receives a user's voice through a microphone (MIC) and then conveys the received voice of the user to the control unit 160, or receives other party's voice through a communication network and then outputs the received voice of the other party as an audible sound through a speaker (SPK). In some embodiments, the audio processing unit 140 outputs a sound effect associated with the execution of an application in the terminal device 100.

The memory unit 150 stores therein an open OS program required for the operation of the terminal device 100, and one or more message processing applications. In some embodiments, the memory unit 150 stores therein a first message processing application 151 and one or more second message processing applications 152. The first message processing application 151 is developed by a manufacturer of the terminal device and installed at the time of manufacture of the terminal device, and configured to process a message received or to be transmitted in the terminal device 100. The second message processing applications 152 are developed by a third party other than a terminal device manufacturer by utilizing an API offered by the open OS program, and uses and processes a received message according to the priority thereof and a predetermined option to receive or not a message.

Here, a plurality of the second message processing applications 152 developed by different developers (third parties other than a terminal device manufacturer) is installed in the terminal device 100. The second message processing applications 152 are designed to perform different functions so long as having a function or processing associated with a message received in the terminal device 100. When the second message processing applications 152 are installed in the terminal device 100, the second message processing applications 152 define, through an interface offered by the open OS, the priority thereof and option to receive or not a message.

Additionally, in some embodiments, the first message processing application 151, which is installed for transmission, reception and management of messages in the terminal device 100, is a system application installed as a default in the terminal device 100 by a manufacturer of the terminal device, but not limited to. Alternatively, the first message processing application 151 is a message processing application selected to have to receive a message from among message processing applications installed for transmission, reception and management of messages by a user.

Further, the memory unit 150 stores therein user data created or received during the operation of the terminal device 100. In some embodiments, the user data includes a message received or to be transmitted by the terminal device 100, and such messages is stored and managed as message database classified and created according to respective message processing applications.

The control unit 160 is configured to perform and control the overall operation of the terminal device 100. In some embodiments, the control unit 160 constructs an operating environment by executing an open OS program stored in the memory unit 150 and also installs the one or more second message processing applications 152 downloaded by a user's selection or malicious access without a user's recognition. In addition, the control unit 160 defines priority and an option to receive or not a message for each message processing application in response to one or more requests from one or more second message processing applications 152 installed through an interface supported in the open OS constructed by the open OS program.

Additionally, when a message is received through the communication unit 110, the control unit 160 of this disclosure delivers the received message to the at least one of first message processing application 151 and the second message processing applications 152 such that one or more of the at least one of first message processing application 151 and the second message processing applications 152 processes the received message according to a predefined algorithm. In some embodiments, when a message is received, the control unit 160 sequentially delivers the received message according to priorities registered in one or more of the at least one first message processing application 151 and the second message processing applications 152. Also, after waiting for a predetermined time from said deliver, the control unit 160 controls re-transmission of the message to the first message processing application 151 through a channel which is separated from a channel for sequentially delivering. Therefore, even though the message fails to be delivered sequentially to the first message processing application 151 due to interference or abnormal operation of one or more second message processing applications 152, the first message processing application 151 normally receives and processes the message through a separated transmission path.

In some embodiments, the predetermined time is a waiting time necessary to transmit a transmitted message to a specific message processing application (the first message processing application) again after the message is transmitted to a plurality of message processing applications. Also, the separated transmission path is able to be a logical concept rather than a physical concept, and an open OS program such as Android generates intents to access various components provided by a platform, and accesses the platform using the intents. The separated transmission path is provided to explain the transmission of a message to the first message processing application using different intent from those processing the transmission of a message to a plurality of message processing applications.

Further, after the message is delivered to the first message processing application 151, the control unit 160 checks whether there is the same message as the delivered message in the message DB assigned to the first message processing application 151. If there is no same message stored in the message DB, the control unit 160 controls the delivered message to be stored in the message DB. In this manner, the message DB is prevented from repeatedly storing the same message.

Figure 2:
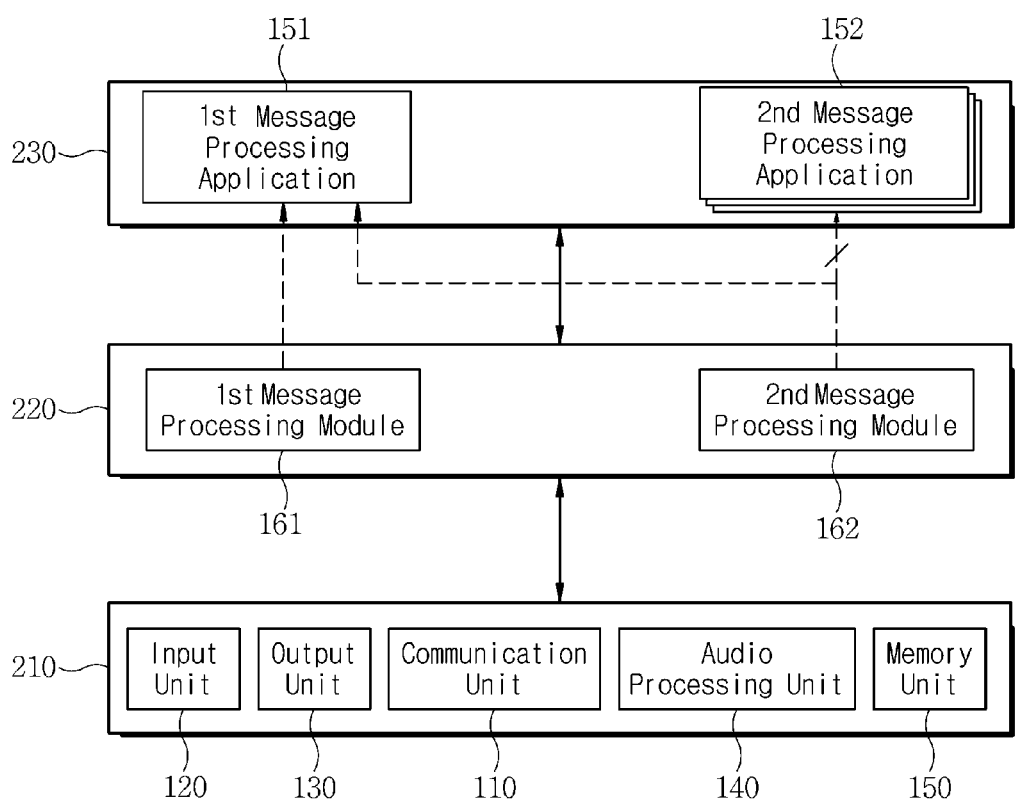
FIG. 2 is a schematic diagram of a hierarchical structure of a terminal device in accordance with some embodiments of the present disclosure.

For the above, in some embodiments, the control unit 160 includes a first message processing module 161 and a second message processing module 162, which are shown in FIG. 2. A message processing procedure of this disclosure by the first and second message processing modules 161 and 162 will be described with reference to FIG. 2.

FIG. 2 is a schematic diagram of a hierarchical structure of a terminal device in accordance with some embodiments of the present disclosure. FIG. 2 namely shows the operating system of the terminal device 100 as a plurality of hierarchical layers according to functionality.

Referring to FIG. 2, in some embodiments, the terminal device 100 includes a hardware layer 210, a platform layer 220, and an application layer 230.

The hardware layer 210 refers to physical elements of the terminal device 100, namely mechanical units that constitute the terminal device 100, including the communication unit 110, the input unit 120, the output unit 130, the audio processing unit 140 and the memory unit 150, which are discussed previously in FIG. 1.

The platform layer 220 is constructed by the open OS program stored in the memory unit 150 of the terminal device 100 and executed by the control unit 160 and provides execution environments of various applications including the message processing applications. The platform layer 220 controls a plurality of elements of the hardware layer 210 and supports that the application layer 230 is able to use one or more functions (e.g., input, output, memory, communication, etc.) executed through the hardware layer 210. In some embodiment, the platform layer 220 includes a combination of a microprocessor and the open OS program. In some embodiments, the first and second message processing modules 161 and 162 are included in the platform layer 220 and perform a function to deliver a message, which is received through the communication unit 110 of the hardware layer 210, to applications of the application layer 230.

The application layer 230 performs various application functions by operating on the basis of environments constructed by the platform layer 220, and, in some embodiments, contains various applications including the message processing applications. In some embodiments, the application layer 230 includes the at least one first message processing application 151 and the one or more second message processing applications 152. The at least one first message processing application 151 is a system application installed in advance by a manufacturer, and the one or more second message processing applications 152 are developed by a third party developer other than the manufacturer of the terminal device and then installed in the terminal device 100.

In some embodiments, the one or more second message processing applications 152 define and register the option to receive or not a message and related priorities of the second message processing applications, through the platform layer 220.

In this above-discussed hierarchical structure, if any message is received through the communication unit 110 of the hardware layer 210, the second message processing module 162 sequentially creates and delivers a normal message intent for delivering a message in order of higher priority in case it is defined to receive a message, according to the priority and option to receive or not a message defined and registered for each of the at least one first message processing application 151 and the one or more second message processing applications 152.

Figure 3:
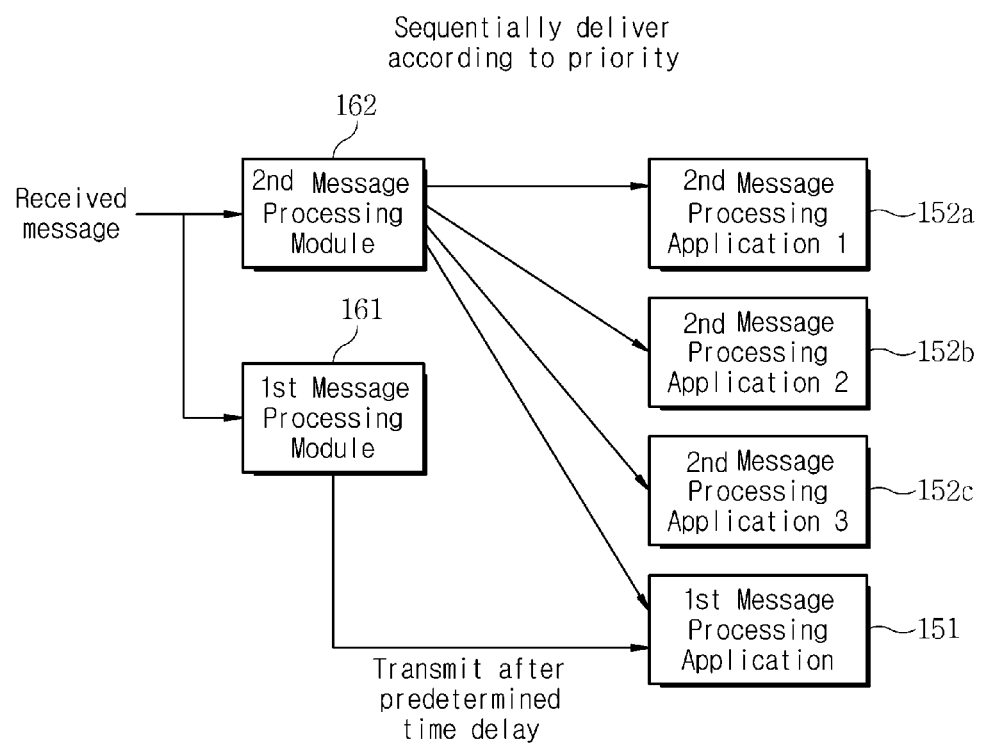
FIG. 3 is a schematic diagram of a message processing procedure in a terminal device in accordance with some embodiments of the present disclosure.

Therefore, as shown in FIG. 3, if the second message processing applications 1~3 152a to 152c and the first message processing application 151 are defined and registered to receive a message, and when the second message processing applications 1~3 152a to 152c have higher priorities than the first message processing application 151, the second message processing module 162 delivers the received message in order of the second message processing application 1 152a, the second message processing application 2 152b, the second message processing application 3 152c, and the first message processing application 151.

Referring to FIG. 2, separately from the second message processing module 162, the first message processing module 161 supports a dedicated path for delivering the received message to a specific message processing application, i.e., the first message processing application 151 that basically performs transmission, reception and management of a message, from among the plurality of message processing applications.

In some embodiments, when a message is received through the communication unit 110, the first message processing module 161 creates dedicated message intent for delivering the received message to the first message processing application 151. Then the first message processing module 161 transmits the dedicated message intent to the first message processing application 151 after waiting for a given time.

Therefore, as shown in FIG. 3, the first message processing module 161 transmits, separately from the second message processing modules 162, the received message to the first message processing application 151 after a delay of a given time.

In case the message is delivered normally to the first message processing application 151 through the second message processing applications 1~3 152a to 152c while the message is delivered by the second message processing module 162, the first message processing application 151 receives in duplicate the same message from the first and second message processing modules 161 and 162. For this case, when the received message is delivered to the message DB of the first message processing application 151 in response to a request of the first message processing application 151, the control unit 160 controls to check first of all whether there is the same message and then to store the message only if there is no same message.

Therefore, even though the message is delivered to the first message processing application 151 by the second message processing module 162, the same message can be prevented from being received and processed twice.

On the contrary, in case the message delivery is blocked by one of the second message processing applications 1~3 152a to 152c or in case the message cannot be delivered due to a response failure caused by any abnormal operation, the first message processing application 151 receives and processes the message from the first message processing module 161.

Figure 4:
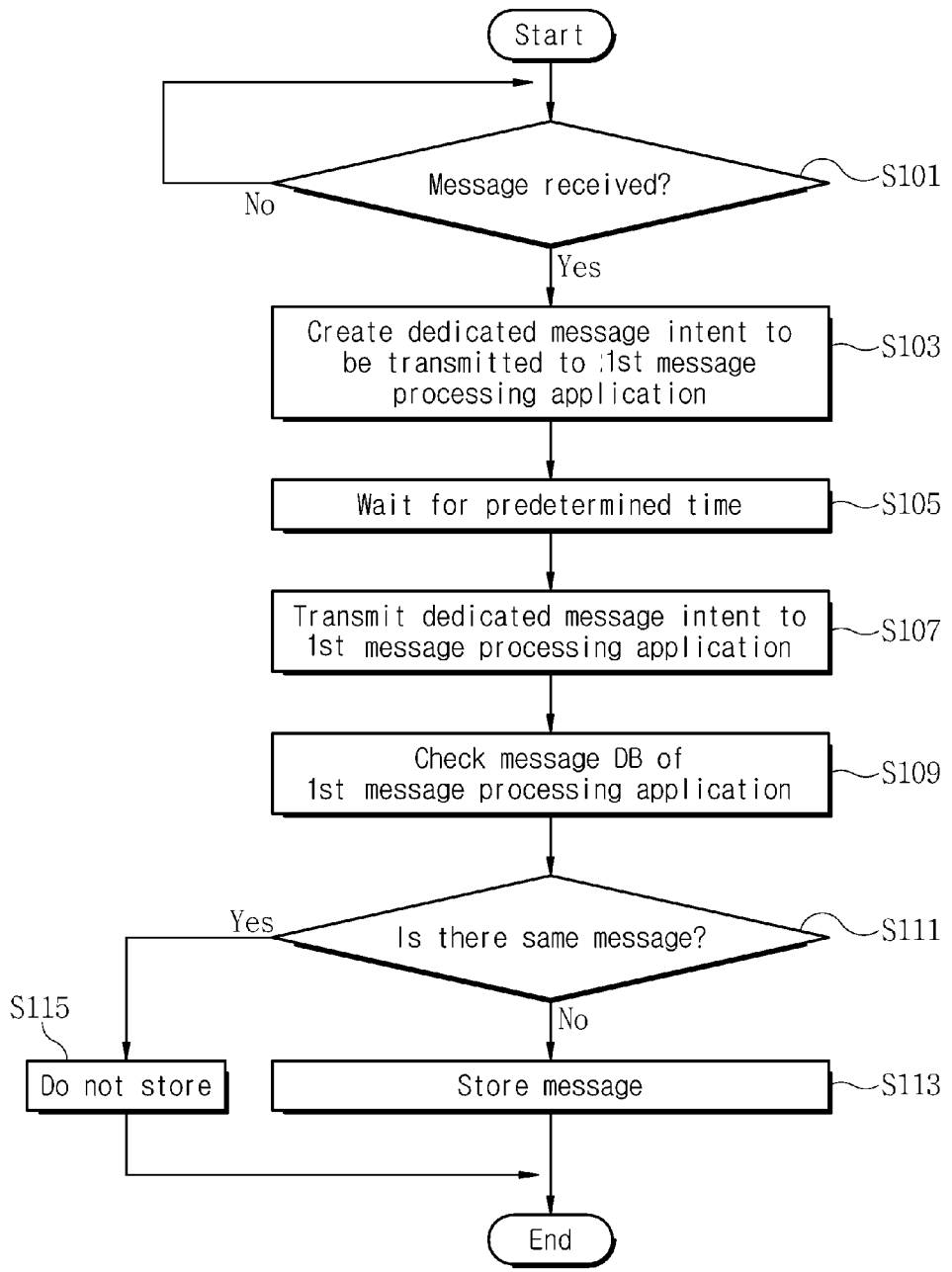
FIG. 4 is a flowchart of a message processing procedure in a terminal device in accordance with some embodiments of the present disclosure.

FIG. 4 is a flowchart of a message processing procedure in a terminal device in accordance with some embodiments of the present disclosure. In some embodiments, the message processing procedure according to this disclosure to be discussed hereinafter is implemented and stored in a computer-executable recording medium which is executed by a processor of the terminal device 100, namely, the control unit 160. Also, in the following description, a message processing method is applied to the terminal device 100 having the open OS that allows an application developed by a third party other than a manufacturer of the terminal device 100 to be installed and to receive a message transmitted to the terminal device 100, and also is executed by, especially, the first message processing module 162 of the control unit 160.

Referring to FIG. 4, the control unit 160, especially the first message processing module 161, of the terminal device 100 according to this disclosure waits for a message containing at least one of text, video and audio to be received through the communication unit 160 (S101).

If a message is received, a dedicated message intent for transmitting the message to the first message processing application 151 is created (S103). Here, an intent is what is used for a communication between activities in a program, and is formed to include an operation to be executed, detailed data required for the operation, a data type, detailed information about action, a component using intent, and the like. The dedicated message intent is defined to process the received message at the first message processing application 151. In some embodiments, the message is a received message transmitted from a sender, and the message intent is an object defined to access the open OS platform. In some embodiments, the message intent includes the message. In some embodiments, the message intent is defined in a message form including the message, and the message intent is transmitted to the first message processing application. In some embodiments, a message that a normal message intent and a dedicated message intent include is the same received message transmitted from the sender, but exhibits different operations to be executed, detailed data necessary for the operations, etc. That is, while the normal message intent is defined to deliver a message to a second message processing application in a defined sequence, the dedicated message intent is defined to deliver a message to a designated first message processing application, and to perform an operation of waiting for a predetermined time. Thus, while the normal message intent and the dedicated message intent include the same message, they exhibit different parameters and detailed data that they desire to include according to the function and definition of an intent.

Thereafter, the first message processing module 161 waits for a predetermined time (S105) and then delivers the dedicated message intent to the first message processing application 151 (S107).

Additionally, in case of desiring to store the received message in the message DB by the first message processing application 151, the first message processing module 161 checks whether there is the same message in the message DB of the first message processing application 151 (S109).

If there is the same message in the message DB, the received message is not stored, and if there is no same message in the message DB, the message is stored in the message DB (S111, S113, and S115).

Therefore, the received message in the terminal device 100 is delivered to the first message processing application 151 and processed safely without duplicated storing. As a result, a user is able to check the received message.

In some embodiments, the above-discussed message processing method according to this disclosure is implemented in the form of program being readable through a variety of computer means and be recorded in any non-transitory computer-readable medium. Here, this medium, in some embodiments, contains, alone or in combination, program instructions, data files, data structures, and the like. These program instructions recorded in the medium are, in some embodiments, specially designed and constructed for the present disclosure or known to persons in the field of computer software. For example, the medium includes hardware devices specially configured to store and execute program instructions, including magnetic media such as a hard disk, a floppy disk and a magnetic tape, optical media such as CD-ROM (Compact Disk Read Only Memory) and DVD (Digital Video Disk), magneto-optical media such as floptical disk, ROM, RAM (Random Access Memory), and flash memory. Program instructions include, in some embodiments, machine language codes made by a complier and high-level language codes executable in a computer using an interpreter or the like. These hardware devices are, in some embodiments, configured to operating as one or more of software to perform the operation of this disclosure, and vice versa.

A computer program (also known as a program, software, software application, script, or code) for implementing the message processing method according to this disclosure is, in some embodiments, written in a programming language, including compiled or interpreted languages, or declarative or procedural languages. A computer program includes, in some embodiments, a unit suitable for use in a computing environment, including as a stand-alone program, a module, a component, or a subroutine. A computer program is or is not, in some embodiments, correspond to a file in a file system. A program is, in some embodiments, stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program is, in some embodiments, deployed to be executed on one or more computer processors located locally at one site or distributed across multiple remote sites and interconnected by a communication network.

While this disclosure has been particularly shown and described with reference to an exemplary embodiment thereof, it will be understood by those skilled in the art that various changes in form and details may be made therein without departing from the spirit and scope of this disclosure as defined by the appended claims.

In the terminal device having the open OS that not only allows installation of a message processing application developed by a third party in addition to a message processing application developed by a manufacturer and installed in the terminal device at the time of manufacture of the terminal device, but also allows the third party message processing application to receive a message transmitted to the terminal device, a message is sequentially delivered to at least one message processing application according to priorities assigned to installed message processing applications and, after waiting for a predetermined time, is transmitted again to the message processing application developed by the manufacturer. Therefore, even though a certain message is blocked by the message processing application developed by a third party and having higher priority than the message processing application installed by the manufacturer has, or even though the message processing application having higher priority operates abnormally, the message processing application developed by the manufacturer and installed basically at the time of manufacture of the terminal device can stably receive a message and then offer it to a user.

As a result, even though a message processing application capable of receiving and using a message, such as a malicious application installed for an illegal purpose, snatches a message associated with user authentication for payment or sing-in to disallow a user to ascertain it, the message processing application basically installed by the manufacturer stably receives a message and offers it to a user. Therefore, this disclosure can prevent any illegal, unperceived action such as micro payment or sign-in, thus minimizing user's undesirable harm. Through this, the present disclosure contributes to the growth of industry associated with applications capable of receiving and using a message and related service industry. Additionally, this disclosure has industrial applicability since there is sufficient marketability and actual executability.

What is claimed is:

1. A terminal device, comprising:
   a communication unit, including a communication module consisting of circuits, configured to receive a signal for a message containing at least one of text, video and audio, through a communication network;
   a memory unit, including one or more non-transitory recording medium, configured to store a plurality of message processing applications, and store the message of the received signal in a message database (DB), wherein the plurality of message processing applications includes a first message processing application installed at a time of manufacture of the terminal device and one or more second message processing applications additionally installed in the terminal device; and
   a control unit, implemented by a processor, configured to perform
      a first delivering of the message, received through the communication unit, sequentially to the one or more second message processing applications and the first message processing application, stored in the memory unit, through a first transmission path, and
      a second delivering, at a first predetermined time after said first delivering, of the message of the received signal again to only the first message processing application through a second transmission path different from the first transmission path such that the message is successfully delivered to the first message processing application.

2. The terminal device of claim 1, wherein the control unit is further configured to, after said second delivering the message to the first message processing application,
check whether the message DB assigned to the first message processing application stores the same message as the message being delivered, and
control the message to be stored in the message DB when the message DB does not store the same message as the message being delivered.

3. The terminal device of claim 1,
wherein the second message processing application is developed, by a third party other than a manufacturer of the terminal device, by utilizing an Application Programming Interface (API) of an open operating system.

4. The terminal device of claim 1, wherein the control unit is further configured to, in said first delivering, sequentially deliver the message to the plurality of message processing applications, based on predetermined priorities of the plurality of message processing applications.

5. The terminal device of claim 1, wherein the control unit comprises:
a first message processing module configured to sequentially create and deliver a normal message intent for said delivering of the message to at least one of the plurality of message processing applications, according to priorities of the plurality of message processing applications and options of the plurality of message processing applications, the options defining whether to receive the message; and
a second message processing module configured to
create a dedicated message intent for said second delivering of the message to the first message processing application, and
deliver the dedicated message intent to the first message processing application at a second predetermined time after creating the dedicated message intent.

6. The terminal device of claim 1, wherein the second transmission path is separated from the first transmission path.

7. A message processing method performed by a terminal device comprising a processor, the processor to execute the message processing method comprising:
receiving a signal for a message containing at least one of text, video and audio;
firstly creating the message from the received signal, and delivering the firstly created message sequentially to a plurality of message processing applications, which are installed in the terminal device, through a first transmission path, wherein the plurality of message processing applications includes a first message processing application installed at a time of manufacture of the terminal device and one or more second message processing applications additionally installed in the terminal device;
secondly creating the message from the received signal, wherein the secondly created message is identical to the firstly created message and is a message dedicated to be delivered to the first message processing application; and
transmitting the secondly created message to only the first message processing application, at a predetermined time after delivering the first created message through a second transmission path different from the first transmission path.

8. The method of claim 7, further comprising:
checking whether the firstly created message is successfully delivered to the first message processing application and stored in a message database (DB) assigned to the first message processing application; and
storing the secondly created message in the message DB assigned to the first message processing application when the firstly created message, which is the same as the secondly created message, is check not to store in the message DB.

9. The method of claim 7, further comprising:
delivering the secondly created message to the first message processing application through a transmission path which corresponds to the first message processing application and is separated from a transmission path for delivering the firstly created message to the plurality of message processing applications.

10. The method of claim 7,
wherein the second message processing applications are developed, by a third party other than a manufacturer of the terminal device, by utilizing an Application Programming Interface (API) of an open operating system.

11. The method of claim 7, wherein the delivering the normal the firstly created message comprises
sequentially delivering the firstly created message to the plurality of message processing applications, based on an order of predetermined priorities of the plurality of message processing applications.

12. A non-transitory computer-readable storage medium storing a program for causing a processor to execute operations comprising:
receiving a signal for a message containing at least one of text, video and audio;
firstly creating the message from the received signal, and delivering the firstly created message sequentially to a plurality of message processing applications, which are installed in the terminal device, through a first transmission path according to priorities of the plurality of message processing applications, wherein the plurality of message processing applications includes a first message processing application installed at a time of manufacture of the terminal device and one or more second message processing applications additionally installed in the terminal device;
secondly creating the message from the received signal, wherein the secondly created message is identical to the firstly created message and is a message dedicated to be delivered to the first message processing application; and
transmitting the secondly created message to only the first message processing application, at a predetermined time after delivering the first created message through a second transmission path different from the first transmission path.

13. The non-transitory computer-readable storage medium of claim 12, wherein the operations further comprise:
checking whether the firstly created message is successfully delivered to the first message processing application and stored in a message database (DB) assigned to the first message processing application; and
storing the secondly created message in the message DB assigned to the first message processing application when the firstly created message, which is the same as the secondly created message, is check not to store in the message DB.

14. The non-transitory computer-readable storage medium of claim 12, wherein the operations further comprise:
delivering the secondly created message to the first message processing application through a transmission path which corresponds to the first message processing application and is separated from a transmission path for delivering the firstly created message to the plurality of message processing applications.

15. The non-transitory computer-readable storage medium of claim 12,
wherein the second message processing applications are developed, by a third party other than a manufacturer of the terminal device, by utilizing an Application Programming Interface (API) of an open operating system.

16. The non-transitory computer-readable storage medium of claim 12, wherein the delivering the normal the firstly created message comprises
sequentially delivering the firstly created message to the plurality of message processing applications, based on an order of predetermined priorities of the plurality of message processing applications.

* * * * *